United States Patent Office 3,201,255
Patented Aug. 17, 1965

3,201,255

PHOTOPOLYMERIZATION OF VINYL MONOMERS BY MEANS OF THALLIUM COMPOUNDS AS CATALYSTS

Fritz W. H. Mueller and Curt B. Roth, Binghamton, N.Y., assignors to General Aniline & Film Corporation, New York, N.Y., a corporation of Delaware No Drawing. Filed Aug. 19, 1959, Ser. No. 834,630
14 Claims. (Cl. 96—115)

This invention relates to the formation of polymers by the photoinduced polymerization of monomeric vinyl compounds while employing as a catalyst therefor a radiation sensitive thallium compound.

It is known to effect the photopolymerization of vinyl compounds by means of radiation sensitive catalysts. Thus, a vinyl monomer containing a radiation sensitive silver compound undergoes photopolymerization when exposed to or irradiated with electromagnetic radiations varying in wave length of from $10^{-1}$ to $10^{-10}$ centimeters. Such photopolymerization may be carried out wherein the polymers are produced in solution or suspension, or a light sensitive layer can be prepared whereupon the exposure is carried out through a pattern or stencil resulting in imagewise photopolymerization, that is, a polymeric photographic image or photo-resist is formed.

We have now discovered that the photopolymerization of vinyl monomers can be initiated by employing as the catalyst for said photopolymerization a compound or salt of the metal thallium.

We have further ascertained that the photo-chemical activity of the thallium compounds particularly the halides can be enhanced by the use of chemical and optical sensitizers in a manner analogous to the chemical and optical sensitization of conventional silver halide photographic emulsion.

We have found that the halides of thallium which are precipitated in the presence of an excess of thallous or thallic ions are particularly useful as polymerizing catalysts.

It is, therefore, an important object of the invention to provide solid polymers and a method for their production by irradiation of vinyl monomers in the presence of a thallium compound.

It is another object of the invention to provide solid polymers and a method for their production by irradiation of vinyl monomers in the presence of a thallium compound and a chemical sensitizer.

It is still another object of the invention to provide solid polymers and a method for their production by irradiation of vinyl monomers in the presence of a thallium compound and an optical sensitizer.

Other objects will appear hereinafter as the description proceeds.

The new method as disclosed herein of obtaining photographic images does not rely on the chemical reduction of metal salts by an organic reducing agent to form a metallic image. The metal salts are only used as catalysts to induce polymerization of suitable monomers and relief images are the result. Our method, therefore, is not limited to the use of insoluble light sensitive compounds. It is immaterial if the metal salts such as the thallium compounds are removed or not when the relief image is "developed." Development of the relief image in the sense of this invention specifies only washing with water or another suitable solvent to dissolve the unreacted monomer. Therefore, we may use soluble or insoluble thallous or thallic salts that may be organic or inorganic.

As pointed out above, the sensitivity of our photopolymerization system can be enhanced by the use of chemical sensitizers of the type commonly employed to sensitize silver halide photographic emulsion. Thus, we have ascertained that certain heavy metal salts, when used in combination with the thallium compound, are much more effective in bringing about photopolymerization of a vinyl monomer than thallium compounds alone. For instance, a mixture of acrylamide with a cross-linking agent, such as N,N′-methylene-bis-acrylamide in the presence of a thallium nitrate required an exposure period of about 60–70 minutes to effect photopolymerization. When, however, the same reaction mixture contained a small amount of gold chloride, photopolymerization under the same conditions occurred in 12 minutes. In each instance, a solid high molecular weight polymerized product was obtained.

The mechanism of this sensitization co-catalysis is likewise not well understood, but it might be assumed that the spectral absorption of thallous salts is extended both to the short and long wave sides of the spectrum through the interaction of the sensitizing metal salts with the thallous compounds in a manner similar to that described by E. Brauer, Phot. Korr., 94, 35–40 (1958).

We have also used thallium compounds as catalysts in the form of thallium halide emulsions including the print-out type of emulsions in which thallium ions are contained in excess. Such thallium halide emulsions and their preparation are described later in the appended examples. (Example 16.)

Heavy metals, the salts of which we have found suitable as sensitizers for thallium compounds include such metals as gold, rhodium, silver, etc. In the case of gold salts, the sensitizing effect is even greater in the presence of sodium nitrite.

Other chemical sensitizers useful for the above purpose include the sulfur and reduction sensitizers, thiourea derivatives, thiocyanates, stannous salts, ascorbic acid, etc. The incorporation of such chemical sensitizers in light sensitive silver halide photographic emulsion is well known and this technique is discussed in detail in the various photographic journals and patents. A general treatise is presented in "The Theory of the Photographic Process," by C. E. K. Mees, Chapter 4, Revised Edition, copyright 1954 by the Macmillan Company.

We have also determined that certain compounds referred to in the art as optical sensitizers are capable of enhancing or extending the spectral response of our photopolymerization system. Optical sensitizers which have proved to be particularly efficacious in this connection are those known sensitizers of light sensitive silver halide photographic emulsion and include the sensitizing dyes as cyanines, merocyanines, hemicyanines, styryls and the like. Although the exact manner by which the sensitizer dyes enhance the photopolymerization reaction is not exactly known, it is presumed that radiant energy, absorbed by the sensitizer, is transferred to the system of monomer and thallium compound.

Since the unsensitized thallium compounds require, in most cases, exposure to a light source rich in ultraviolet radiation in order to effect photopolymerization of the vinyl monomers, the discovery that optical sensitizers are capable of extending the response of the system to other radiations such as visible light constitutes an important advantage of the invention. Thus, the photopolymerization reactions as described herein can be brought about by exposure to a wide band of electromagnetic radiations extending in wave length from about $10^{-1}$ to $10^{-10}$ centimeters. Radiations which we have suitable for our purposes include gamma rays, X-rays, ultraviolet light, visible light and the like.

Sensitizing dyes, of the type useful for our purpose are described in detail in the chemical literature and in numerous photographic patents and publications. For a general treatise on such dyes, reference is made to the aforementioned Mees, "The Theory of the Photographic Process."

It is to be understood that all radiation sensitive thallium compounds of the type described herein are effective catalysts in a general sense and, therefore, are not restricted to a few selected compounds. However, it is also obvious that those thallium compounds capable of operating in such a way as to destroy the vinyl monomer are excluded. Thus, certain thallium compounds such as thallous picrate are explosive which would make its application as a catalyst for the purpose of the instant invention impractical.

Examples of thallium compounds possessing the necessary prerequisites include thallous acetate, thallous bromide, thallous carbonate, thallous chloride, thallous fluorosilicate, thallous formate, thallous oxalate, thallous formate-malonate, thallous hydroxide, thallous iodide, thallous nitrate, thallous oxide, thallous phosphate, thallous sulfate, thallous bromate, thallous chlorate, thallous perchlorate, thallous cyanide, thallous orthophosphate, thallous pyrophosphate, thallous methoxide, thallous myristate, thallous sulfite, thallous thiocyanate, thallous sulfide and the like.

Only small quantities of the thallium compound are required as compared to the quantity of monomer. Thus, we have effectively employed a thallium compound such as thallous nitrate in an amount by weight as low as 1 mg. per 1.5 g. of the monomer. Although greater amounts of the thallium catalyst by weight may be employed, it is generally unnecessary to do so. We have, for instance, obtained excellent results when the amount of thallium compound was approximately 3.4 mg. per 3.0 g. of the monomer.

In using the heavy metal salts as photographic sensitizers for the thallium compounds, only materials of the highest purity were selected. In this connection, we found the analytically pure reagents entirely satisfactory.

The amount of the metal salt photographic sensitizers or promoters employed in the photopolymerization of vinyl monomers as described herein is quite small and is required only in sensitizing amounts.

The optical sensitizers, i.e., the sensitizing dyes, are also used in sensitizing amounts and constitute a relatively small percentage of the thallium photopolymerization catalyst. In general, it has been our finding that the ratio of sensitizing dye to thallium halide can be employed in a ratio similar to the proportion of sensitizing dye to silver halide in conventional photographic emulsions.

Of the vinyl monomers, including mixtures thereof which can be used for photopolymerization purposes by irradiation in the presence of a thallium compound and a promoter therefor, the following are typical: acrylamide, N-hydroxymethyl acrylamide, acrylonitrile, N-ethanol acrylamide, methacrylic acid, methacrylamide, calcium acrylate, acrylic acid, vinyl acetate, methyl methacrylate, ethyl acrylate, methyl acrylate, vinyl benzoate, vinyl pyrrolidone, vinyl methyl ether, vinyl butyl ether, vinyl isopropyl ether, vinyl isobutyl ether, vinyl butyrate, butadiene or mixtures of ethyl acrylate with vinyl acetate, acrylonitrile with styrene, butadiene with acrylonitrile, etc.

In the event that it is desired to produce a polymer of increased hardness, the polymerization is carried out with a vinyl monomer to which has been added a small amount of an unsaturated compound containing at least two terminal vinyl groups each linked to a carbon atom in a straight chain or attached to a ring. The function of these compounds is to cross-link the polyvinyl chain and they are generally referred to as cross-linking agents. Such entities are described, for example, by Kropa and Bradley in vol. 31, No. 12 of "Industrial and Engineering Chemistry," 1939. Suitable cross-linking agents of this type include N,N'-methylene-bis-acrylamide, triallylcyanurate, divinyl benzene, divinyl ketones and diglycol diacrylate.

In such monomer mixtures, it is a common practice to employ from 10 to 50 parts of monomer to each part of the cross-linking agent. However, it is to be understood that this ratio may be varied in order to obtain copolymers of the desired degree of hardness and strength or other physical properties.

The photopolymerization of the type described herein can be carried out in a homogeneous system or a heterogeneous system. If the former is desired, a solvent is selected capable of dissolving all the components of the system, i.e., monomer, thallium compound, sensitizers, etc., and the resulting solution exposed to radiation to bring about photopolymerization. In the homogenous system, we have found it convenient to employ water as a solvent and water soluble monomers and catalysts.

In the event the monomer possesses limited solubility in water, it may be advantageous to employ a water miscible solvent such as a lower aliphatic alcohol as an aid in dissolving and keeping the said monomer in solution.

If, on the other hand, the components of the system are insoluble, they can be used in the form of a dispersion and then irradiated in order to effect photopolymerization. Suitable dispersing agents for use in this connection are, for example, long chain fatty acid sarcosides or taurides, i.e., oleyl-N-methyl taurine, stearyl sarcosine; keryl benzene sulfonate (made by reacting chlorinated kerosene with benzene and sulfonating the resulting product); the reaction product of from 12 to 20 mols of ethylene oxide with a phenol such as dibutyl phenol, a fatty alcohol, i.e., lauryl alcohol, an amine, i.e., rosin amine or a fatty acid, i.e., stearic acid; dioctyl sulfo succinate; fatty alcohol sulfonates, i.e., α-hydroxyoctodecane sulfonic acid, lauryl sulfonate or the like. Dispersions may also be made by dissolving a resin such as ethyl cellulose in toluene and dispersing an aqueous solution or mixture of the monomer and silver compound in the resulting oil. In the case of the thallium halides, they may be prepared in the dispersed state analogous to silver halide emulsion or according to the method of E. Brauer as described in Phot. Korr., 94, 35–40 (Nov. 3, 1958).

In the event that the photopolymerization is carried out in solution or suspension, the reaction is carried out by irradiating the vinyl monomer mixture contained in reactors of the type commonly employed for this purpose. If ultraviolet or visible light radiation is employed, the walls of the container should be of such a nature as to be transparent to such radiations. If X- or gamma rays are the exciting radiation, the walls may be of any material permeable thereto and in this connection reference is made to glass, steel, aluminum or the like.

The various radiations and rays used to effect photopolymerization as described herein may be derived from various sources and the prior art can be consulted in this connection. However, we have determined that visible radiation may be supplied by photoflash lamps or tungsten filament lamps. As a source of X-rays, a conventional machine designed for this purpose can be employed. Gamma radiation is conveniently supplied from a cobalt-60 isotope source. The distance of the radiation source is of the order 4½ to 12 inches from the walls of the reactor. The photopolymerization as described above may be carried out batchwise or the process may be carried out continuously. In the latter case, the vinyl monomer or mixtures thereof, thallium catalyst and promoter therefor, is continuously fed into the reactor and the so-obtained polymers withdrawn as it is formed. Such a continuous operation and the apparatus used therefor is described in USP 2,122,805, granted July 5, 1938.

Our photopolymerization process is eminently suitable for the production of polymeric photographic images. Such imagewise photopolymerization can be carried out by forming a coating of the light sensitive monomer or mixtures thereof admixed with the thallium catalyst and/or sensitizers therefor after which the so-obtained coating is exposed under a pattern, stencil, photographic negative or in a camera. In some instances, it may be desirable to mix the light sensitive thallium compound and monomer with a colloid carrier of the type used in the preparation of photographic emulsion and in this connection mention is made of such carriers as gelatin, polyvinyl alcohol, starch, glue, carboxymethyl cellulose, polyamide, polyvinyl pyrrolidone and the like.

Suitable supports for such coatings are of the type commonly employed in the photographic art and include such materials as glass, metal, plastic, e.g., cellulose triacetate, terephthalic acid polyester, paper, etc. After exposure of the light sensitive coating, development consists only in removing unpolymerized monomer in the unexposed areas usually by means of a wash with e.g., water or other suitable solvents or by means of a transfer leaving behind an insoluble polymerized relief image.

Our process may be used in numerous commercial applications. It may, for instance, be used to produce relief printing plates, negative working offset plates or the like. By staining the resist or coating with appropriately colored inks and dyestuffs, the image density can be accordingly increased. After exposure and removal of the unpolymerized parts, negatives or positives for direct inspection are thus obtained.

Other uses of our invention include preparation of printing materials, image transfer materials, printing masks, photolithographic printing plates of all types, lithographic cylinders, printing stencils and printing circuits, microfilm, proof-paper, photographic stencils.

The following examples will serve to illustrate our invention in greater detail although it is to be understood that such examples are given as illustrative only and are not to be construed as limiting the invention.

EXAMPLE 1

A monomer mixture was prepared from the following components:

| | | |
|---|---|---|
| Acrylamide | g | 180 |
| N,N'-methylene-bis-acrylamide | g | 7 |
| Water | ml | 120 |

To 5.00 ml. of this mixture was added at room temperature 0.33 ml. of a 1% aqueous thallous nitrate solution diluted with 0.67 ml. of deionized water. The resulting composition, contained in a 12.5 x 1.5 cm. test tube, was placed on a revolving stand and exposed while rotating at a speed of 1 revolution per minute to a 150 volt ultraviolet light source located at a distance of 17 cm. from the center of rotation. Polymerization began by a sharp increase in temperature which occurred after 20.5 minutes at 25° C. and was complete at the end of 26 minutes with the formation of a solid polymeric mass.

If the above composition was exposed in the absence of thallous nitrate, polymerization began only after a lapse of 32 minutes and reached completion after a total time of 36 minutes.

The ultraviolet lamp was purchased from Hanovia Chem. Mfg., Newark, N.J., and designated as Type 9420.

As is customary in polymerization work, the progress of the exothermic vinyl polymerization reaction was followed by plotting the temperature versus time. The curves obtained showed a slow increase in temperature (about 4 to 8° C. over a period of from 10 to 40 minutes) with slowly increasing viscosity. At about the gelation point, the temperature curve shows a sharp increase (about 60 to 90° C. over a period of about two to three minutes). The polymerization can be considered complete at the point of maximum temperature. Another method of comparing various experiments could be the time it takes to reach a certain temperature (e.g., 100° C.). The period from the beginning of the experiment to the point of a sharp temperature increase may be called initiation period for the sake of easy comparison.

EXAMPLE 2

The procedure of Example 1 was followed excepting that (0.34 ml. of deionized water was used and) 0.33 ml. of a 1:1000 (by weight) aqueous potassium iodide solution was added to the system as a catalyst promoter. Photopolymerization now began after 18.5' and was complete at the end of 24 minutes with the formation of a solid polymeric mass.

EXAMPLE 3

The procedure was the same as in Example 1 but using 0.34 ml. of deionized water and 0.33 ml. of a 1:1000 (by weight) aqueous auric chloride solution. Photopolymerization began after 17.5' and was complete at the end of 22.5 minutes with the formation of a solid polymeric mass.

EXAMPLE 4

The procedure was the same as in Example 1 but using 0.34 ml. of deionized water and 0.33 ml. of a 1:1000 (by weight) aqueous rhodium trichloride solution. Photopolymerization began after 16' and was complete at the end of 22.5 minutes with the formation of a solid polymeric mass.

EXAMPLE 5

The procedure was the same as in Example 1 but using 0.34 ml. of deionized water and 0.33 ml. of a 1:1000 (by weight) aqueous silver nitrate solution. Photopolymerization began after 15' and was complete at the end of 18 minutes with the formation of a solid polymeric mass.

If the same concentration of silver nitrate was used in the absence of thallous nitrate, the initiation period was 17 minutes. It is obvious then that the mixture of thallous nitrate and silver nitrate has a synergistic effect and speeds up the onset of photopolymerization.

EXAMPLE 6

The procedure of Example 1 was followed but using 0.34 ml. of deionized water and 0.33 ml. of a 1:1000 (by weight) aqueous sodium nitrite solution and 0.33 ml. of a 1:1000 (by weight) gold chloride solution. Photopolymerization started after 14 minutes and was complete at the end of 19 minutes with the formation of a solid polymer.

EXAMPLE 7

Into a test tube were placed 5.0 ml. of the monomer mixture of Example 1, 0.33 ml. of an aqueous 1% thallium nitrate solution, 0.33 ml. of an aqueous potassium iodide solution (1.000 g. of potassium iodide diluted with water to a total volume of 1.000 liter), and 2.0 ml. of a 4% gelation solution. The mixtures were then exposed and the temperature increases recorded as described previously.

If a photographically active gelatin was used, the polymerization time was 29 minutes. If a photographically inert gelatin was used, the polymerization time was 54 minutes. If the 2.0 ml. of 4% gelatin was omitted completely and 2.0 ml. of distilled water used instead, the polymerization time was 36 minutes.

EXAMPLE 8

Into a test tube were placed 5.0 ml. of the monomer mixture of Example 1, 0.33 ml. of an aqueous 1% (by weight) thallous nitrate solution, 2.0 ml. of a 4% gelatin solution, and 1 drop (1/20 ml.) of a thiourea solution (containing 28.8 mg. per 5000 ml. distilled water). The mixture was stirred for 60 seconds in red light and then exposed to UV radiation from a GE H-100 A-4 lamp placed 7.5 cm. from the center of the test tube. After 48 minutes, the polymerization was complete and the product was a solid polymeric mass.

Into a test tube was placed the identical mixture as above, but without the thiourea. This blank without thiourea, was mixed and exposed exactly like the above sample. The polymerization was complete after 62 minutes (measured from beginning to maximum temperature).

EXAMPLE 9

Into a test tube was placed 5.0 ml. of the monomer mixture of Example 1, 0.33 ml. of an aqueous 1% (by weight) thallous nitrate solution, 2.0 ml. of a 4% aqueous gelatin solution, and 1 drop (1/29 ml.) of a sodium thiosulfate solution (containing 28.8 mg. per 5000 ml. distilled water). The mixture was stirred for 60 seconds in red light and then exposed to UV radiation from a GE H–100 A–4 lamp placed 7.5 cm. from the center of the test tube. After 44 minutes, the polymerization was complete and the product was a solid polymeric mass.

Into a test tube was placed the identical mixture as above, but without the sodium thiosulfate. This blank without sodium thiosulfate was mixed and exposed exactly like the above sample. The polymerization was complete after 62 minutes (measured from beginning to maximum) temperature.

EXAMPLE 10

Into a test tube was placed 5.0 ml. of the monomer mixture of Example 1, 0.33 ml. of an aqueous 1% (by weight) thallous nitrate solution, 2.0 ml. of a 4% aqueous gelatin solution, and 1 drop (1/29 ml.) of a sodium sulfite solution (containing 28.8 mg. per 5000 ml. distilled water). The mixture was stirred for 60 seconds in red light and then exposed to UV radiation from a GE H–100 A–4 lamp placed 7.5 cm. from the center of the test tube. After 38 minutes, the polymerization was complete and the product was a solid polymeric mass.

Into a test tube was placed the identical mixture as above, but without the sodium sulfite. This blank without sodium sulfite was mixed and exposed exactly like the above sample. The polymerization was complete after 62 minutes (measured from beginning to maximum temperature).

EXAMPLE 11

Into a test tube was placed 5.0 ml. of the monomer mixture of Example 1, 0.33 ml. of an aqueous 1% (by weight) thallous nitrate solution, 2.0 ml. of a 4% aqueous gelatin solution, and 1 drop (1/29 ml.) of an ascorbic acid solution (containing 28.8 mg. per 5000 ml. of distilled water). The mixture was stirred for 60 seconds in red light and then exposed to UV radiation from a GE H–100 A–4 lamp placed 7.5 cm. from the center of the test tube. After 52 minutes, the polymerization was complete and the product was a solid polymeric mass.

Into a test tube was placed the identical mixture as above, but without the ascorbic acid. This blank without ascorbic acid was mixed and exposed exactly like the above sample. The polymerization was complete after 62 minutes (measured from beginning to maximum temperature).

The following examples are illustrative of the manner by which thallium compounds can be used as catalysts for the production of polymeric photographic relief images.

EXAMPLE 12

A monomer mixture was prepared from the following components:

*Mixture B*

| | |
|---|---|
| Acrylamide ----------------------------------g-- | 180 |
| N,N'-methylene-bis-acrylamide ----------------g-- | 7 |
| Water --------------------------------------ml-- | 120 |

A second mixture was prepared from the following components:

*Mixture A*

| | Ml. |
|---|---|
| Gelatin (10% aqueous solution) ---------------- | 35 |
| Saponin (aqueous solution, 8%) ---------------- | 0.5 |
| Water ---------------------------------------- | 1.0 |
| Thallous nitrate (1% aqueous solution by weight --- | 0.1 |

A and B were mixed in total darkness and stirred at 40° C. for 40 minutes after which the mixture was coated on an aluminum foil, chilled, set and dried. The metal foil had been previously washer with dimethylformamide and methanol. By previous etching the metal base with such well known etching agents as phosphoric acids, esters, alcohols and the like, adherence of the coating to the base can be increased. However, the etched treatment is not necessary unless unusual tenacity between the coating composition and metal base is required.

The coating was then exposed through a pattern such as a silver negative, with a mercury vapor lamp in order to effect photopolymerization of the monomer coating in the exposed areas. The metal plate was then rinsed in warm water in order to remove the unpolymerized portions in the unexposed areas of the coating leaving the polymerized relief image adhering to the metal base in the exposed areas. An exposure time of 21 minutes gave a satisfactory polymeric image of good resolving power.

As pointed out elsewhere in the specification, the polymerized images can be dyed with a suitable pigment or other water soluble colorant or with an oil soluble dye dissolved in a mixture of dibutyl phthalate-tricresyl phosphate-benzyl alcohol (e.g., 5:4:1) and dispersed as finely divided liquid particles of colloidal size homogeneously throughout the gelatin phase.

EXAMPLE 13

A coating was prepared using the procedure of Example 12 excepting that Mixture A of Example 12 contained the following components:

| | Ml. |
|---|---|
| Aqueous gelatin (10% solution) ---------------- | 35 |
| Saponin (8% aqueous solution) ---------------- | 0.5 |
| Thallous nitrate (1% aqueous solution) ----------- | 0.1 |
| Auric chloride (1:1000 aqueous solution) --------- | 1.0 |

The dried coating was then exposed with a mercury lamp as in Example 12. An exposure interval of 4 minutes yielded, after washing, a polymerized relief image in the exposed areas, clearly demonstrating the speed increasing effect of gold salt addition.

EXAMPLE 14

The procedure as given in Example 12 was followed excepting that Mixture A of Example 12 was prepared as follows:

| | Ml. |
|---|---|
| Gelatin (10% aqueous solution) ---------------- | 35 |
| Saponin (8% aqueous solution) ---------------- | 0.5 |
| Thallous nitrate (1% aqueous solution) ---------- | 0.1 |
| Rhodium trichloride (1:1000 aqueous solution) ---- | 1.0 |

A coating was prepared and exposed for 4 minutes to ultraviolet light which was sufficient to obtain a tough polymeric relief image if the gelatin was active.

EXAMPLE 15

The procedure as given in Example 12 was followed excepting that Composition A was prepared as follows:

| | Ml. |
|---|---|
| Gelatin (10% aqueous solution) ---------------- | 35 |
| Saponin (8% aqueous solution) ---------------- | 0.5 |
| Thallous nitrate (1% aqueous solution) ---------- | 0.1 |
| Silver nitrate (1:1000 aqueous solution) ---------- | 1.0 |

A coating was prepared from the above composition and exposed for a period of 4 minutes to ultraviolet radiation. After development in the usual way, a hard polymerized relief image was obtained in the exposed areas. If less active gelatins are used, the exposure time may have to be extended.

The following examples illustrate specifically the use of sensitizers enhances the spectral response of the photopolymerization of vinyl monomers in the presence of a thallium compound catalyst.

EXAMPLE 16

A thallium bromide iodide emulsion was prepared in the following manner:

(1) 100.0 grams of inactive gelatin were mixed with 900 ml. of water and kept for 30 minutes at room temperature (28° C.). The mixture was then heated to 40° C. and stirred at this temperature for 30 minutes. To this solution was then added 32.7 g. (1.1 mol) of KBr and 2.08 g. (0.05 ml.) of KI.

(2) 66.5 grams (1.0 mol) of $TLNO_3$, anhydrous were dissolved in 200 ml. of boiling hot distilled water.

(3) Solution 2 was added to solution 1 at 30° C. over a period of 90 seconds. The mixture was chilled immediately (without digestion) and noodled. A sample was analyzed and contained 28.8 mg. of thallium per gram of emulsion.

The above thallium emulsion was diluted 1 to 4 with water and 0.8 ml. of this solution was used together with 5 ml. of the monomer Mixture B of Example 12, 2 ml. of a 4% gelatin solution, 1 drop of an aqueous ammonium aurous thiocyanate solution containing 400 mg. of metallic gold per liter and 1 drop of a methanol solution of 3,3′-diethyl-9-methylthiacarbocyanine iodide containing 1 mg. of solute per 2000 ml. of solvent were placed in a 12.5 x 1.5 cm. test tube and exposed to visible radiation. After an exposure of 17 minutes, a solid polymeric mass had formed.

The source of the visible radiation was a GE 100–F–4 lamp (mercury with cadmium) situated at a distance of 15 cm. from the test tube containing the monomer mixture. The ultraviolet radiation of the lamp was filtered out by means of 2 Ansco UV 16 filters especially designed to absorb this type of radiation. As a consequence, all photopolymerization reactions initiated by exposure to the radiation from this lamp was therefore exclusively due to visible radiation.

EXAMPLE 17

A mixture of monomer, gelatin and thallium halide emulsion was prepared as described in Example 16 excepting that the gold and sensitizing dye were omitted. 0.13 ml. of a 1% aqueous thallium nitrate solution was then added so that the thallium halide emulsion contained a 20% excess of thallium as thallium nitrate. The resulting mixture of monomer and thallium print-out type emulsion was exposed to light as described in Example 12. At the end of 29 minutes, a hard polymeric mass was obtained.

EXAMPLE 18

The same procedure was followed as given in Example 17 except that 1 drop of gold sensitizer of Example 16 was also used. At the end of a 22 minute exposure to visible light, a hard polymeric mass was obtained.

EXAMPLE 19

The procedure of Example 16 was carried out except that the gold sensitizer of Example 16 was eliminated from the monomer thallium halide emulsion. After an exposure period of 32 minutes to light, a hard polymeric mass was obtained.

EXAMPLE 20

In the following example, the monomer-thallium halide emulsion was exposed to light in the absence of any optical sensitizers and/or chemical sensitizers. An exposure time of 47 minutes was required before polymerization of the monomer was effected. A comparison shows that the time required for photopolymerization of the sensitized monomer-thallium halide emulsions as represented by Example 16 was approximately one-third that of the unsensitized composition of the instant example.

We claim:

1. A process for producing a polymeric photographic image which comprises exposing at atmospheric pressure to an electromagnetic radiation pattern having a wave length of from $10^{-1}$ centimeters to $10^{-10}$ centimeters, a radiation sensitive photographic material comprising a mixture of a polymerizable compound containing the grouping $CH_2{=}C{<}$ and as the sole catalyst for said polymerization a radiation sensitive material selected from the class consisting of thallous compounds and mixtures thereof with a photographic sensitizer selected from the class consisting of salts of gold, rhodium and silver.

2. The process as defined in claim 1 wherein the metal is gold.

3. The process as defined in claim 2 wherein the exposing radiation is ultraviolet radiation.

4. A process for producing a polymeric photographic image which comprises exposing at atmospheric pressure to an electromagnetic radiation pattern having a wave length of from $10^{-1}$ centimeters to $10^{-10}$ centimeters, a radiation sensitive photographic material comprising a mixture of a polymerizable compound containing the grouping $CH_2{=}C{<}$ and as the sole catalyst for said polymerization, a radiation sensitive material consisting of thallous compounds admixed with a photographic sensitizing dye.

5. The process as defined in claim 4 wherein the exposing radiation is visible light.

6. The process as defined in claim 4 wherein the sensitizing dye is a cyanine dye.

7. A process of producing by photopolymerization a polymeric photographic image which comprises irradiating at atmospheric pressure to a pattern of electromagnetic radiation having a wave length of from $10^{-1}$ to $10^{-10}$ centimeters of a photographic element comprising a support having thereon a radiation sensitive layer comprising a polymerizable compound containing the grouping $$CH_2{=}C{<}$$

and a colloidal carrier therein and as the sole catalyst for the photopolymerization, a radiation sensitive material selected from the class consisting of thallous compounds and mixtures thereof with a salt of a metal selected from the class consisting of gold, rhodium and silver.

8. The process as defined in claim 7 wherein the metal is gold.

9. A process of producing by photopolymerization a polymeric photographic image which comprises irradiating at atmospheric pressure to a pattern of electromagnetic radiation having a wave length of from $10^{-1}$ to $10^{-10}$ centimeters, a photographic element comprising a support having thereon a radiation sensitive layer comprising a polymerizable compound containing the grouping $CH_2{=}C{<}$ and a colloidal carrier therein and as the sole catalyst for the photopolymerization, a radiation sensitive material consisting of thallous compounds admixed with a sensitizing dye.

10. The process as defined in claim 9 wherein the sensitizing dye is a cyanine dye.

11. A radiation sensitive photographic element comprising a support and having thereon a radiation sensitive layer comprising a mixture of a polymerizable compound containing the grouping $CH_2{=}C{<}$, a photographic colloidal carrier therefor and as the sole catalyst for effecting polymerization, a radiation sensitive material consisting of thallous compounds admixed with a sensitizing dye.

12. The product as described in claim 11 wherein the sensitizing dye is a cyanine dye.

13. A radiation sensitive photographic element comprising a support and having thereon a radiation sensitive layer comprising a mixture of a polymerizable compound containing the grouping $CH_2{=}C{<}$, a photographic colloid carrier therefor and as the sole catalyst for effecting polymerization, a radiation sensitive material selected from the class consisting of thallous compounds and mixtures thereof with a salt of a metal selected from the class consisting of gold, rhodium and silver.

14. The product as described in claim 13 wherein the metal salt is a gold salt.

References Cited by the Examiner

UNITED STATES PATENTS

| | | | |
|---|---|---|---|
| 2,628,167 | 2/53 | Overman | 96—110 |
| 2,760,863 | 8/56 | Plambeck | 96—115 |
| 2,887,445 | 5/59 | Calfee et al. | 204—162.1 |
| 3,041,172 | 6/62 | Evans et al. | |

FOREIGN PATENTS

| | | |
|---|---|---|
| 774,897 | 5/57 | Great Britain. |

OTHER REFERENCES

Transactions of the Faraday Society, v. 35 (1939), pages 1022, 1023 and 1053.

Chemical Abstracts, vol. 16 p. 2266 (1922) "Optical Sensitization, III."

NORMAN G. TORCHIN, *Primary Examiner.*

JOHN R. SPECK, HAROLD N. BURSTEIN, LOUISE P. QUAST, MILTON STERMAN, *Examiners.*